March 16, 1965     D. W. L. CLAMP     3,173,507
WEIGHBRIDGES
Filed April 1, 1963
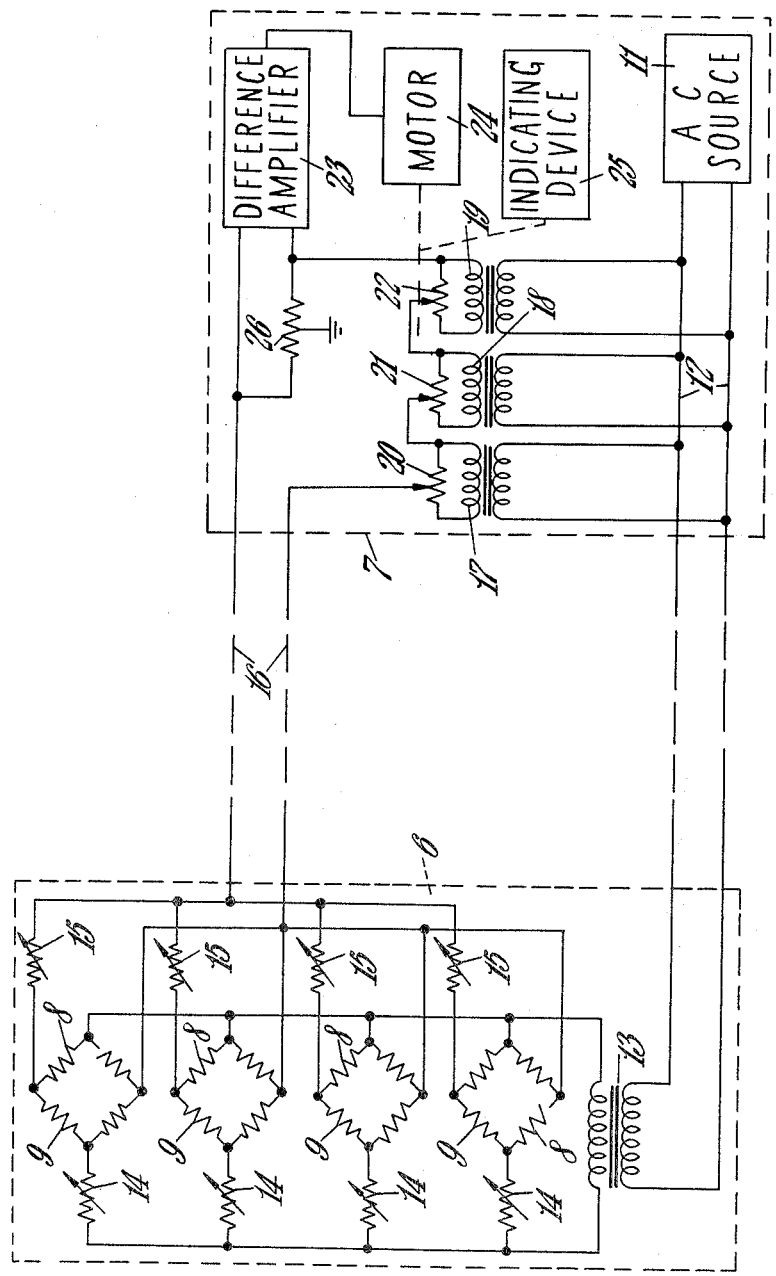

United States Patent Office 3,173,507
Patented Mar. 16, 1965

3,173,507
WEIGHBRIDGES
David Warwick Lloyd Clamp, Knowle, England, assignor to Joseph Lucas (Industries) Limited, Birmingham, England
Filed Apr. 1, 1963, Ser. No. 269,335
Claims priority, application Great Britain, Apr. 17, 1962, 14,779/62
6 Claims. (Cl. 177—211)

This invention relates to weighbridges of the kind including a plurality of load cells to which the load to be measured is applied.

It has been found that when using such weighbridges the readings of the weighbridge may vary with the position of the load on the weighbridge. This effect results from employing load cells having unequal output impedances. If a load is eccentrically positioned on the weighbridge it may effectively short-circuit one or more of the load cells. This would not matter if the load cells were of equal output impedance, but where they are not the above-mentioned inaccuracy arises.

The object of this invention is to minimise this difficulty.

The invention resides in a method of manufacturing a weighbridge of the kind specified, including connecting the load cells in parallel to a common output cable through resistors respectively the resistances of which are chosen so that the output impedances of the load cells are equal.

The invention further resides in a weighbridge of the kind specified in which the load cells are connected in parallel to a common output cable through resistors respectively, the resistances of the resistors being so chosen that the output impedances of the load cells are equal.

As a further optional feature, the load cells are connected in parallel to a common input cable through resistors respectively whereby the sensitivities of the load cells can be varied.

The present invention is one of a series of five applications numbered 269,335 to 269,339 and all relating to weighbridges. The accompanying drawing is a diagram illustrating one example of the present invention as applied to a weighbridge incorporating features which are specifically claimed in the other four applications in the series.

Referring to the drawings, the apparatus includes a weighing station 6 at which the actual weighing operation is performed, and a remote recording station 7. The weighbridge at the weighing station includes a plate (not shown) for receiving vehicles or other goods to be weighed, the plate being supported at its four corners by four bridge-type load cells 8.

Each load cell 8 incorporates four strain gauges (illustrated as resistors 9) connected in a bridge network, deformation of two of the gauges under load serving to provide an output from the bridge which is dependent on the load, and the other two gauges providing temperature compensation in known manner.

The A.C. input supply to the four load cells is supplied from a source 11 at the recording station through a cable 12 extending from the recording station to the weighing station, the cable incorporating a transformer 13 intermediate its ends. The transformer 13 is positioned at the weighing station as close as possible to the load cells 8, so that the length of cable between the transformer 13 and the load cells is kept to a minimum. The effect of this is to keep the voltage drop along the length of cable feeding the load cells to a minimum. It will be appreciated that where the cable extends between the recording and weighing stations, its length may be substantial so that the effect of the voltage drop along the cable may result in inaccurate results. However, by the arrangement described above, the length of the cable between the transformer and the load cells is small, so that errors due to the length thereof are minimised. Moreover, the importance of any errors due to the relatively long cable between the supply and the transformer is reduced in the ratio of the transformer.

The inputs to the four load cells are fed through four resistors 14 respectively, the resistances of these resistors being adjusted on the site to determine the sensitivity of the respective load cells 8.

The output from the four load cells 8 are fed through four resistors 15 respectively, these resistors being pre-set on installation of the weighbridge to ensure that the output impedances of the four load cells are equal. This point is of considerable importance if, as is usually the case, it is possible to weigh a load distributed unevenly with respect to the load cells. In such a case, one of the load cells may in effect be short-circuited. This will not matter if the output impedances of all the load cells are equal, but if they are unequal, different readings will be obtained depending upon which load cell is short-circuited.

The output cable 16 from the load cells to the recording station is not, as is common practice, combined in a four-cable with the input cable 12. The output cable is separated from the input cable by a sufficient distance to obviate transformer effects on the output current as a result of current flowing in the input cable. It is found that the use of a four-core cable (as is common in electrical weighbridges) results in inaccurate readings as a result of such effects.

The output cable is connected to a measuring circuit at the recording station, the measuring circuit including first, second and third secondary transformer windings 17, 18, 19 and first, second and third resistors 20, 21, 22 connected across these windings. The secondary windings may be fed from a common primary winding or from separate primary windings as shown, the power in either case being derived from the source 11.

One load of the output line 16 is connected to a variable point on the resistor 20, whilst one end of the winding 17 is connected to a variable point on the resistor 21. One end of the winding 18 is connected to a slider movable along the resistor 22 whilst one end of the winding 19 is connected to a difference amplifier 23 which also receives an input from the other lead of the output line 16. The output from the amplifier 23 drives a motor 24 which in turn drives the slider of resistor 22 as indicated by a dotted line in the drawing.

The arrangement is such that the motor 24 drives the slider until the inputs to the amplifier 23 from the load cells 8 and the windings 17, 18, 19 are equal, at which point any convenient indicating device 25 operated by the motor shaft indicates the load on the weighbridge.

The variable point on the resistor 20 is pre-set to allow for the weight of the plate, so that a zero indication will be obtained with no load on the weighbridge. The variable point on the resistor 21 can be adjusted to change the zero reading so that, for example, the weighbridge reads zero when an unladen lorry is on the weighbridge.

The arrangement described has the advantage that the three secondary windings 17, 18, 19 act independently, so that adjustment of one resistor does not necessitate adjustment of the other resistors.

A further disadvantage with weighbridges of the general type to which this invention relates is that there is often a phase difference between the input voltage to the load cells and the voltage developed by the load cells which adversely affects the operation of the measuring apparatus. It has previously been the practice to overcome this difficulty by a lengthy process of trial and error involving earthing various points in the electrical circuit through capacitors. In the present example, however, this difficulty is overcome simply by connecting a resistor 26 across the amplifier and earthing a point intermediate the ends thereof, the precise point to be earthed being determined by trial and error.

Having thus described my invention what I claim as new and desire to secure by Letters Patent is:

1. A weighbridge including a plurality of load cells to which the load to be measured is applied, in which the load cells are connected in parallel to a common output cable through independently variable resistors respectively, the resistances of the resistors being so chosen that the output impedances of the load cells are equal.

2. A weighbridge as claimed in claim 1 in which the load cells are connected in parallel to a common input cable through resistors respectively whereby the sensitivities of the load cells can be varied.

3. A weighbridge comprising in combination a weighing station and a recording station, a plurality of load cells at the weighing station to which the load to be measured is applied, an input cable extending between the recording and weighing stations for supplying A.C. to the load cells, the input cable incorporating a transformer intermediate its ends, an output cable for conducting the output from the load cell or cells to indicating apparatus at the recording station, and a plurality of independently variable resistors through which the load cells respectively are connected in parallel to the output cable, the resistances of said resistors being chosen so that the output impedances of the load cells are equal.

4. A weighbridge as claimed in claim 3 including a plurality of resistors through which the load cells respectively are connected in parallel to the secondary of said transformer whereby the sensitivities of the load cells can be varied.

5. A weighbridge as claimed in claim 3 in which the transformer is positioned at the weighing station in close proximity to the load cells.

6. A weighbridge as claimed in claim 3 in which the input and output cables are separated by such a distance that current flowing in the input cable has substantially no effect on current flowing in the output cable.

References Cited by the Examiner
UNITED STATES PATENTS

| | | | |
|---|---|---|---|
| 2,478,000 | 8/49 | Miller | 323—75 |
| 2,815,480 | 12/57 | Ruge | 323—75 |
| 3,046,411 | 7/62 | Steiner | 323—75 |
| 3,094,184 | 6/63 | Maring | 177—211 |
| 3,100,546 | 8/63 | Cramwinckel | 177—211 |

LEO SMILOW, *Primary Examiner.*